(12) United States Patent
Helmick et al.

(10) Patent No.: US 12,455,833 B2
(45) Date of Patent: Oct. 28, 2025

(54) SYSTEMS AND METHODS FOR ADDRESS TRANSLATION

(71) Applicant: Samsung Electronics Co., Ltd., Suwon-si (KR)

(72) Inventors: Daniel Lee Helmick, Broomfield, CO (US); Sumanth Jannyavula Venkata, Pleasanton, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 39 days.

(21) Appl. No.: 17/850,904

(22) Filed: Jun. 27, 2022

(65) Prior Publication Data

US 2023/0333990 A1 Oct. 19, 2023

Related U.S. Application Data

(60) Provisional application No. 63/332,195, filed on Apr. 18, 2022.

(51) Int. Cl.
*G06F 12/1045* (2016.01)

(52) U.S. Cl.
CPC ...... *G06F 12/1045* (2013.01); *G06F 2212/68* (2013.01)

(58) Field of Classification Search
None
See application file for complete search history.

(56) References Cited

U.S. PATENT DOCUMENTS

| 7,617,377 | B2 | 11/2009 | Moertl et al. |
| 9,354,872 | B2 | 5/2016 | Amidi et al. |
| 9,959,214 | B1* | 5/2018 | Habusha ............. G06F 12/1027 |
| 10,552,340 | B2 | 2/2020 | Feehrer et al. |
| 10,565,126 | B2 | 2/2020 | Beard et al. |
| 10,585,734 | B2 | 3/2020 | Panian et al. |
| 10,831,603 | B2* | 11/2020 | Kulkarni ............... G06F 3/0659 |
| 10,929,310 | B2 | 2/2021 | Borikar et al. |
| 10,949,358 | B2 | 3/2021 | Kounavis et al. |
| 10,977,199 | B2 | 4/2021 | Suri et al. |
| 11,025,544 | B2 | 6/2021 | Marolia et al. |
| 11,048,644 | B1* | 6/2021 | Volpe .................. G06F 12/1072 |
| 11,126,554 | B2 | 9/2021 | Vakharwala et al. |

(Continued)

OTHER PUBLICATIONS

Kommareddy, V. R. et al., "DeACT: Architecture-Aware Virtual Memory Support for Fabric Attached Memory Systems", 2021 IEEE International Symposium on High-Performance Computer Architecture (HPCA), 2021, pp. 453-466, IEEE.

(Continued)

*Primary Examiner* — Yaima Rigol
(74) *Attorney, Agent, or Firm* — Lewis Roca Rothgerber Christie LLP (57) ABSTRACT

A system and method for host provided address translation cache prepopulation. In some embodiments, the method includes: receiving, by a persistent storage device, a first address translation cache entry; receiving, by the persistent storage device, an input-output command; and executing the input-output command, by the persistent storage device, the executing of the input-output command including performing direct memory access of a memory location at an address calculated based on the input-output command and based on the first address translation cache entry.

15 Claims, 5 Drawing Sheets

(56) References Cited

U.S. PATENT DOCUMENTS

| | | |
|---|---|---|
| 2005/0033874 A1* | 2/2005 | Futral .................. G06F 13/28 |
| | | 710/22 |
| 2007/0277000 A1* | 11/2007 | Ohtsuka ............. G06F 12/1027 |
| | | 711/E12.061 |
| 2009/0150605 A1* | 6/2009 | Flynn .................. G06F 13/28 |
| | | 711/E12.001 |
| 2015/0089137 A1 | 3/2015 | Brandyberry et al. |
| 2015/0102249 A1* | 4/2015 | Smick .................. F16H 25/00 |
| | | 251/267 |
| 2015/0331806 A1 | 11/2015 | Mondal et al. |
| 2016/0267016 A1* | 9/2016 | Lee ........................ G06F 9/455 |
| 2018/0018095 A1* | 1/2018 | Lee ..................... G06F 12/1009 |
| 2018/0121121 A1* | 5/2018 | Mehra ..................... G06F 3/061 |
| 2018/0129563 A1 | 5/2018 | Kim et al. |
| 2018/0246816 A1* | 8/2018 | Smith ................ G06F 12/1009 |
| 2018/0341429 A1* | 11/2018 | Bolkhovitin ............ G06F 3/067 |
| 2019/0095343 A1* | 3/2019 | Gopal .................. G06F 12/1027 |
| 2019/0102249 A1* | 4/2019 | Bolkhovitin ........ G06F 11/1068 |
| 2020/0019515 A1 | 1/2020 | Koufaty et al. |
| 2020/0272577 A1 | 8/2020 | Zeng et al. |
| 2020/0387326 A1* | 12/2020 | Chan ................... G06F 9/45558 |
| 2021/0149815 A1 | 5/2021 | Gayen et al. |
| 2021/0173794 A1 | 6/2021 | Koufaty et al. |
| 2021/0406195 A1 | 12/2021 | Vakharwala et al. |
| 2021/0406199 A1 | 12/2021 | Kounavis et al. |
| 2022/0206976 A1* | 6/2022 | Ng .......................... G06F 13/28 |
| 2023/0070125 A1* | 3/2023 | Evans .................... G06F 21/79 |

OTHER PUBLICATIONS

EPO Extended Search Report dated Sep. 12, 2023, issued in corresponding European Patent Application No. 23164698.5 (8 pages).

* cited by examiner

FIG. 1

| | OpCode | PRP/SGL |
|---|---|---|
| DWORD 0 | | |
| DWORD 1 | | |
| DWORD 2 | | |
| DWORD 3 | | |
| DWORD 4 | Metadata Pointer | |
| DWORD 5 | | |
| DWORD 6 | PRP Entry 1 (or SGL part 1) | |
| DWORD 7 | | |
| DWORD 8 | PRP Entry 2 (or SGL part 2) | |
| DWORD 9 | | |
| DWORD 10 | Starting LBA | |
| DWORD 11 | | |
| DWORD 12 | Number of LBAs | |
| DWORD 13 | | |
| DWORD 14 | | |
| DWORD 15 | | |

SYSTEMS AND METHODS FOR ADDRESS TRANSLATION

CROSS-REFERENCE TO RELATED APPLICATION(S)

The present application claims priority to and the benefit of U.S. Provisional Application No. 63/332,195, filed Apr. 18, 2022, entitled "HOST PROVIDED ADDRESS TRANSLATION CACHE (ATC) PREPOPULATION", the entire content of which is incorporated herein by reference.

FIELD

One or more aspects of embodiments according to the present disclosure relate to persistent storage, and more particularly to a system and method for host provided address translation cache prepopulation.

BACKGROUND

Virtual machines running on a host may use memory addresses that differ from those used by the operating system of the host. As such, when the operating system arranges for data to be read from, or written to, a persistent storage device, address translations may be performed. The communications that may occur between the host and the persistent storage device regarding such address translations may affect the latency of operations performed by the persistent storage device.

It is with respect to this general technical environment that aspects of the present disclosure are related.

SUMMARY

In some embodiments, the host may prepopulate an address translation cache of the persistent storage device with the address translation before, or in parallel with, sending the input-output command to the persistent storage device. In such an embodiment, the persistent storage device may begin performing direct memory access to execute the input-output command without first requesting, and waiting for, the address translation.

According to an embodiment of the present disclosure, there is provided a method, including: receiving, by a persistent storage device, a first address translation cache entry; receiving, by the persistent storage device, an input-output command; and executing the input-output command, by the persistent storage device, the executing of the input-output command including performing direct memory access of a memory location at an address calculated based on the input-output command and based on the first address translation cache entry.

In some embodiments, the input-output command is a write command.

In some embodiments, the receiving of the first address translation cache entry includes receiving a Peripheral Component Interconnect Express (PCIe) command including the first address translation cache entry.

In some embodiments, the PCIe command further includes an identifier identifying a host process, a virtual address used by the host process, and an address translation.

In some embodiments, the method further includes storing the first address translation cache entry in a segment of an address translation cache of the persistent storage device, the segment being reserved for prepopulated address translation cache entries.

In some embodiments, the method further includes: determining a first weight for the first address translation cache entry; determining a second weight for a second address translation cache entry stored in an address translation cache of the persistent storage device; determining that the first weight exceeds the second weight; evicting the second address translation cache entry from the address translation cache; and storing the first address translation cache entry in the address translation cache.

In some embodiments, the receiving of the first address translation cache entry includes: implementing, by the persistent storage device, a snoop of an address location; detecting, by the persistent storage device, through the snoop, that a value stored at the address location has been replaced with a new value; and copying, by the persistent storage device, the new value into an address translation cache of the persistent storage device.

In some embodiments, the memory location is the memory location of a Scatter Gather List (SGL) pointer or of a Physical Region Page (PRP) pointer.

According to an embodiment of the present disclosure, there is provided a method, including: detecting, by a host, a write of an input-output command into a submission queue; and sending, by the host, in response to the detecting, a first address translation cache entry to a persistent storage device.

In some embodiments, the sending of the first address translation cache entry includes sending a Peripheral Component Interconnect Express (PCIe) command including the first address translation cache entry.

In some embodiments, the PCIe command further includes an identifier identifying a host process, a virtual address used by the host process, and an address translation.

In some embodiments, the method further includes reserving a segment of an address translation cache of the persistent storage device for prepopulated address translation cache entries.

In some embodiments, the method further includes detecting, by the host, that the input-output command is at a position in the submission queue leading a head doorbell of the submission queue by a set number.

According to an embodiment of the present disclosure, there is provided a persistent storage device, including: a processing circuit; and a memory, operatively connected to the processing circuit and storing instructions that, when executed by the processing circuit, cause the persistent storage device to perform a method, the method including: receiving a first address translation cache entry; receiving an input-output command; and executing the input-output command, the executing of the input-output command including performing direct memory access of a memory location at an address calculated based on the input-output command and based on the first address translation cache entry.

In some embodiments, the input-output command is a write command.

In some embodiments, the receiving of the first address translation cache entry includes receiving a Peripheral Component Interconnect Express (PCIe) command including the first address translation cache entry.

In some embodiments, the PCIe command further includes an identifier identifying a host process, a virtual address used by the host process, and an address translation.

In some embodiments, the method further includes storing the first address translation cache entry in a segment of an address translation cache of the persistent storage device, the segment being reserved for prepopulated address translation cache entries.

In some embodiments, the method further includes: determining a first weight for the first address translation cache entry; determining a second weight for a second address translation cache entry stored in an address translation cache of the persistent storage device; determining that the first weight exceeds the second weight; evicting the second address translation cache entry from the address translation cache; and storing the first address translation cache entry in the address translation cache.

In some embodiments, the receiving of the first address translation cache entry includes: implementing, by the persistent storage device, a snoop of an address location; detecting, by the persistent storage device, through the snoop, that a value stored at the address location has been replaced with a new value; and copying, by the persistent storage device, the new value into an address translation cache of the persistent storage device.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for host provided address translation cache prepopulation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

When a persistent storage device receives an input-output command from a virtual machine running on a host connected to the persistent storage device, the persistent storage device may request an address translation from a translation agent of the host. The persistent storage device may then translate a virtual address that is part of the input-output command into a physical address in the memory of the host, and execute the input-output command, accessing host memory at the physical address using direct memory access. The steps involved in obtaining and applying the address translation may increase the latency exhibited by the persistent storage device in executing the input-output command.

As such, in some embodiments, the host may send an address translation to the persistent storage device without waiting for the persistent storage device to request the address translation. For example, a virtual machine monitor in the host may monitor submission queue entries generated by virtual machines running in the host. When the virtual machine monitor determines, from a submission queue entry, that the persistent storage device will need an address translation to process the submission queue entry, it may request, from the translation agent, on behalf of the persistent storage device, the address translation that the persistent storage device will need, and the translation agent may then send the address translation to the persistent storage device, where the address translation may be placed in an address translation cache.

Figure 1:
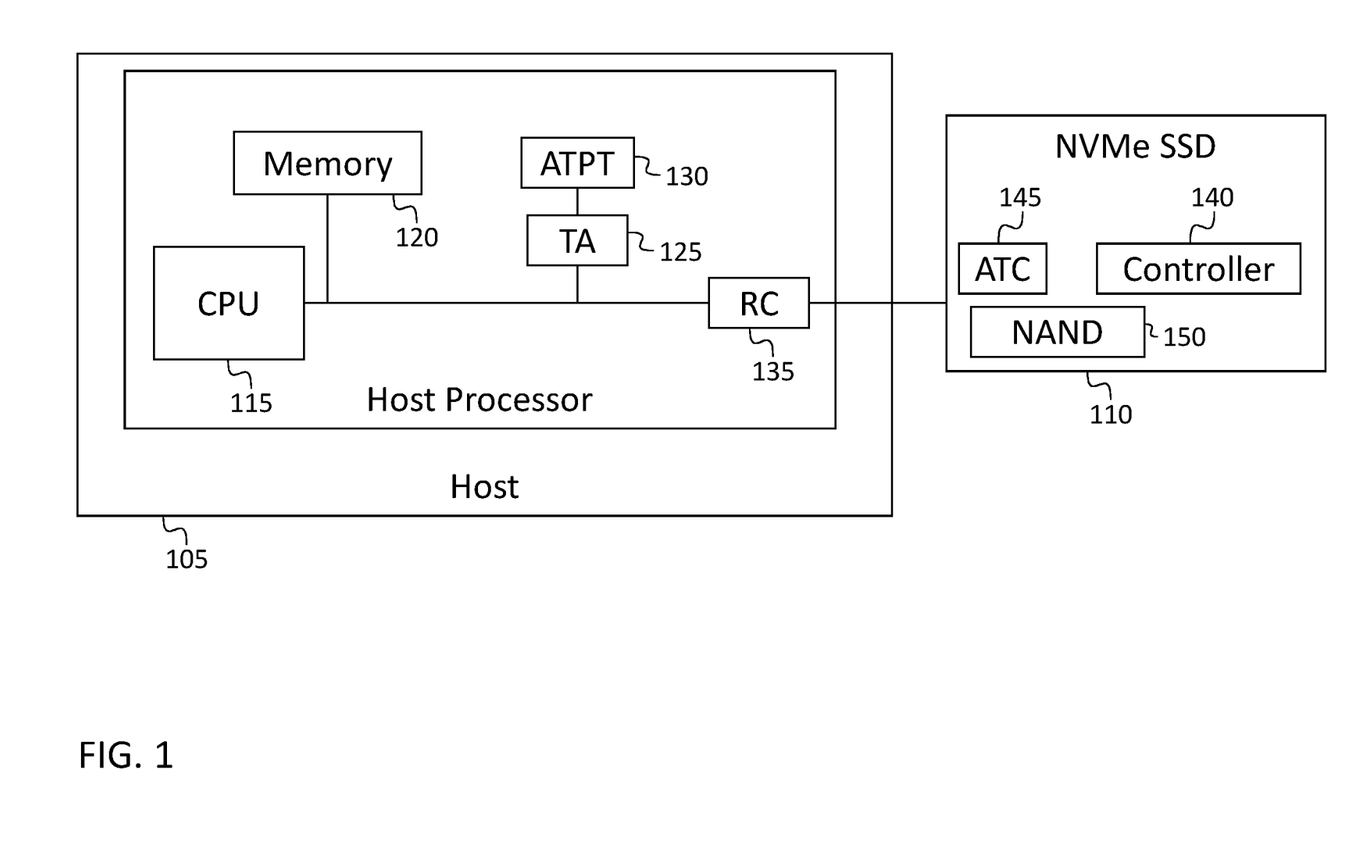
FIG. 1 is a block diagram of a host and a persistent storage device, according to an embodiment of the present disclosure.

FIG. 1 is a block diagram of a host 105 connected to a persistent storage device 110. The persistent storage device 110 may be, for example, a nonvolatile memory express (NVMe) solid state drive (SSD), and it may share an enclosure with the host 105, or it may be an external persistent storage device 110. The host 105 may include a host processor including one or more Central Processing Units (CPUs) 115, a memory 120, a translation agent (TA) 125 connected to an Address Translation and Protection Table (ATPT) 130 and a Root Complex (RC) 135 (which may be a Peripheral Component Interconnect Express (PCIe) Root Complex). The persistent storage device 110 may include a controller 140, an address translation cache (ATC) 145, and a nonvolatile memory 150 (which may be, e.g., NAND Flash memory). The controller 140 may be, or include, a processing circuit, discussed in further detail below. The nonvolatile memory 150 may store instructions that, when executed by the processing circuit, cause the first server to perform one or more of the methods disclosed herein.

Figure 2:
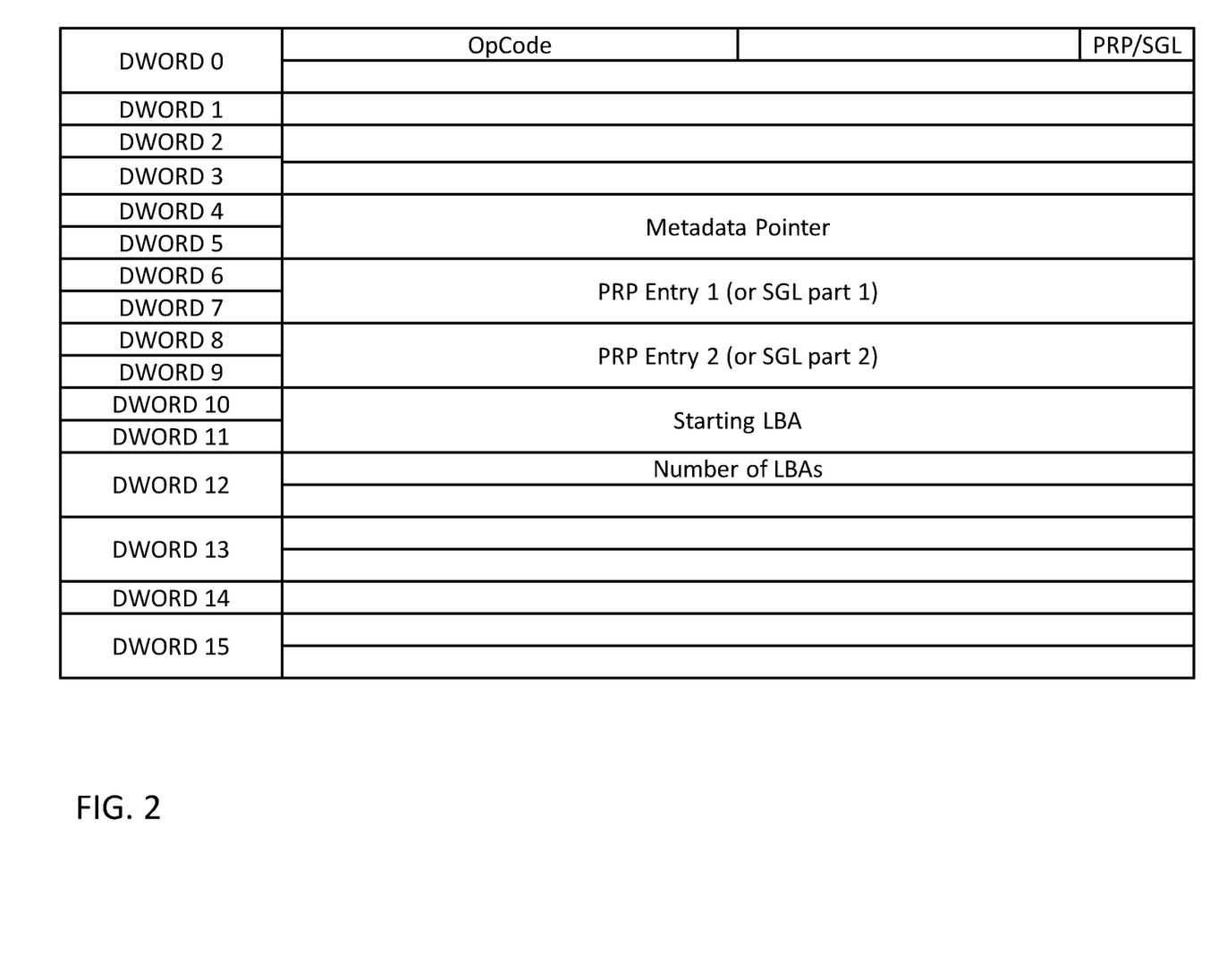
FIG. 2 is a partial table of values of a submission queue entry, according to an embodiment of the present disclosure.

In operation, a host process (e.g., a virtual machine (VM)) may be running on the CPU 115. The host process (e.g., the virtual machine) may use virtual addresses (or "virtualized addresses"), and it may send commands (e.g., input-output commands such as read commands and write commands) to the persistent storage device 110. A read command, for example, may be a command sent to the persistent storage device 110 instructing it to place certain data in the memory 120, beginning at a specified physical address in the memory 120, using direct memory access (DMA). Such a command, when sent by a virtual machine, may include a reference to a virtual address or virtual address range used by the virtual machine; this virtual address range may differ by one or more offsets over portions of the virtual address range from the physical address range(s), in the memory 120, to which the data are to be written. In one embodiment, the range of contiguous addresses may be called "Page Size". Each Page may have a different offset, and this offset may be referred to as an "address translation". Similarly, if the input-output command is a write command, the command may include a virtual address which may need to be translated to a physical address from which the persistent storage device 110 will fetch, using direct memory access, the data to be stored in the persistent storage device 110. Similarly, if the input-output command uses metadata such as Protection Information (PI) to protect the data while in transit and in storage, the persistent storage device 110 will fetch, using direct memory access, the data to be stored and used for the PI checks. FIG. 2 shows the fields of an NVMe submission queue (SQ) entry. Within this SQ entry, the fields that may contain virtual addresses which may be translated before data transfers using direct memory access are performed include a metadata pointer, and pointers to (i) Physical Region Page (PRP) Entry 1 (or Scatter Gather List (SGL) part 1) and to (ii) PRP Entry 2 (or SGL part 2). Other fields in the SQ entry include (i) an OpCode, which specifies whether a read, write, or other command is to be performed, (ii) a PRP/SGL flag, specifying either the data are in SGL or PRP format, (iii) a starting LBA specifying the starting logical block address for the logical blocks to be read or written within the persistent storage device 110, and (iv) a number of LBAs, specifying the number of logical blocks to be read or written.

The address translation may be in the address translation cache 145 of the persistent storage device 110, e.g., if it was recently used. If the address translation is not in the address translation cache 145, the persistent storage device 110 may request the address translation from the translation agent 125 (which may determine the address translation based on values stored in the Address Translation and Protection Table 130) before beginning to access (e.g., read from or write to) the memory 120 using direct memory access. A Page Request Interface (PRI) may or may not be paired with the address translation request, depending on whether the data to be accessed has been swapped out of the memory 120. Once the address translation has been saved in the address translation cache 145, data transfer to or from the host memory (which may be, e.g., host SRAM inside the processor or host DRAM connected to the processor) using direct memory access may begin.

The steps of requesting, and waiting for, an address translation, by the persistent storage device 110, after having received a command from the host, may contribute significantly to the latency exhibited by the persistent storage device 110. As such, in some embodiments, the host 105 may prepopulate the address translation cache 145 with the address translation without waiting for a request, from the persistent storage device 110, for the address translation. The host 105 may be aware of the set of addresses that will be needed by the device for the metadata, SGL, and PRP. Both PRP and SGL may be pointers to additional memory addresses that require additional address translations. The SGLs, for example, may include SGL1 and SGL2 pointing to another SGL descriptor. SGL2 may be an SGL descriptor that may be located using an address translation. Therefore in order to locate all parts of the metadata, SGL, and PRPs in host memory, the memory addresses that are pointers within the metadata, SGL, and PRP structures may also be translated.

Figure 3:
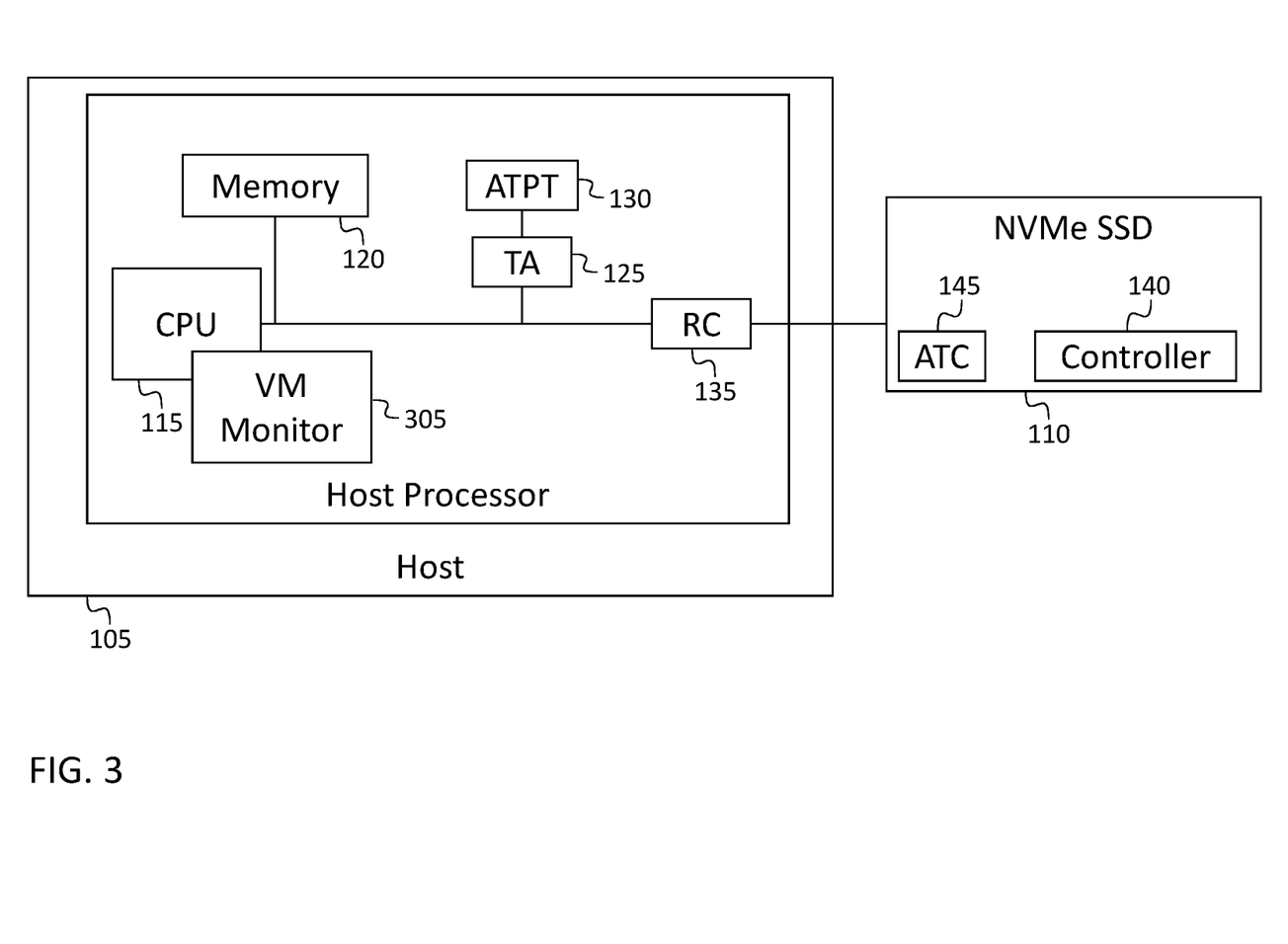
FIG. 3 is a block diagram of a persistent storage device and a host configured to prepopulate an address translation cache of the persistent storage device, according to an embodiment of the present disclosure.

Referring to FIG. 3, the host 105 may include a virtual machine monitor 305, which may monitor the submission queues of the virtual machines running in the host 105. When the virtual machine monitor 305 detects that a new entry has been placed in the submission queue of a virtual machine (or, as discussed in further detail below, that a submission queue entry, for which address translation cache 145 has not yet been prepopulated, is within a threshold lead amount of the head doorbell of the submission queue), it prepopulates the address translation cache 145 with the address translations (e.g., including (i) one or more address translations for the three fields shown in FIG. 2 that may contain virtual addresses which may be translated before data transfers using direct memory access are performed, and additional translations, if needed, for SGL pointers or PRP pointers, as described above) needed to execute the input-output command associated with the submission queue entry.

The host 105 may prepopulate the address translation cache 145 as follows. The CPU or the virtual machine monitor 305 may send, on behalf of the persistent storage device 110, to the translation agent 125, an address translation command requesting that an address translation be determined (e.g., calculated, or looked up in the Address Translation and Protection Table 130) and sent to the persistent storage device 110. The address translation command may include the target PCIe device (e.g., an identifier identifying the PCIe device to which the address translation is to be sent), optionally an identifier for the virtual machine such that the Translation Agent understands how to do the translation, and the virtual address for which an address translation will be needed by the persistent storage device 110. The PCIe device may be a single PCIe device or a function within a PCIe device. It may optionally be identified by a PASID (Process Address Space ID) and or Requester ID of the target PCIe device.

An address translation caching command (e.g., a PCIe command) may then be sent, by the translation agent 125, to the persistent storage device 110. The PCIe standard may be extended to include such a command. The address translation caching command may include (i) an identifier identifying the host process (e.g., the virtual machine) that originated the input-output command (e.g., it may include the Requestor ID (identifying the persistent storage device 110; it may be referred to as the "Requestor ID" even though in some embodiments the virtual machine monitor 305 is making the request, on behalf of the persistent storage device 110)), (ii) the virtual address used by the host process (e.g., used by the virtual machine), (iii) the address translation to be saved to the address translation cache 145 (and to be used to determine the physical address in the memory 120 to be accessed using direct memory access), (iv) a length which represents a range of how many address translations were provided, (v) optionally an identifier of the VM monitor or a flag (e.g., a new response code or identifying field in the PCIe packet) indicating that the address translation was requested by something other than the persistent storage device 110 itself. Upon receipt of the address translation caching command, the persistent storage device 110 may store the address translation in the address translation cache 145, for use in direct memory access in executing the corresponding input-output command, when the corresponding input-output command is being processed.

In some embodiments the host 105 or the persistent storage device 110 may incorporate measures (or "policies") to avoid overfilling the address translation cache 145, which may result in (i) the persistent storage device 110 declining to store an address translation it receives from the host (e.g., if the address translation cache 145 is full or nearly full), or in (ii) the persistent storage device 110 evicting one or more entries from the address translation cache 145 to accommodate a newly received address translation. For example, the persistent storage device 110 may store, in the address translation cache 145, both (i) all entries that the persistent storage device 110 has received from the translation agent 125 in response to requests submitted to the translation agent 125 by the persistent storage device 110, and (ii) entries that the persistent storage device 110 has received from the translation agent 125 in response to requests submitted to the translation agent 125 by the virtual machine monitor 305. A function for assigning a respective weight to each entry in the address translation cache 145 may be defined, and this function may be evaluated for some or all of the entries in the address translation cache 145, e.g., periodically, or when new entries for the address translation cache 145 are received, to determine whether to store newly received entries and whether to evict entries in the address translation cache 145. For example, the function may assign a greater weight to recently received entries, or to recently used entries, and it may assign a high weight (e.g., a weight that prevents eviction under all circumstances) to an entry that is being used for a direct memory access data transfer that is still in progress. For example, a function may assign a medium weight for recently received entries the persistent storage device 110 requested itself, and a function may assign a low weight for recently received entries the virtual machine monitor 305 sent on behalf of the persistent storage device 110.

As another example, the address translation cache 145 may be partitioned into two segments, which may be referred to as a "host-controlled" segment and a "device-controlled" segment. For example, the host 105 may send a command to the persistent storage device 110 instructing the persistent storage device 110 to reserve a segment of the address translation cache 145 as the host-controlled segment, or the persistent storage device 110 may, e.g., at startup, communicate to the host 105 the size of the host-controlled segment. The contents of the host-controlled segment may be controlled exclusively by the host 105, e.g., to prepopulate the address translation cache 145. The host 105 may then have choices regarding how to populate the host-controlled segment. For example, the host-controlled segment may operate as a first-in, first-out (FIFO) data structure (with the oldest entry evicted first, when the host-controlled segment is full), or candidates for eviction from the host-controlled segment may be selected according to another algorithm (e.g., using random replacement, using a queue-based policy, using a recency-based policy (e.g., one in which the least-recently used entry may be evicted first), using a frequency-based policy, or using a policy based on machine learning). Either the host 105 or the persistent storage device 110 may control eviction from the host-controlled segment. In some embodiments, the host 105 specifies, to the persistent storage device 110, the algorithm (or "policy") to be used to control eviction from the host-controlled segment, and the persistent storage device 110 executes the specified algorithm to control evictions. The device-controlled segment may be used by the persistent storage device 110 to store address translations that it receives after requesting them from the translation agent 125.

In some embodiments, if the host submission queue is deeply queued, then there may be a risk of the host 105 flooding the address translation cache 145 of the persistent storage device 110 with more prepopulated address translations than it can accommodate. As such, to avoid overfilling the address translation cache 145, the host 105 may receive the submission queue head doorbell updates from the drive, assume that the persistent storage device 110 drive progress will prioritize commands near the submission queue head doorbell, and therefore prioritize the sending of address translation cache entries that are nearer the head doorbell. For example, referring to FIG. 4, in some embodiments, therefore, the host 105 monitors updates of the submission queue head doorbell (HDB) 405, as the persistent storage device 110 reads entries from the submission queue and advances the submission queue head doorbell. The host may then send one or more new address translation requests to the translation agent on behalf of the device when the input-output command (to which the entry corresponds) is at a position 410 in the submission queue leading the submission queue head doorbell by no more than a set number (e.g., by no more than ten, which would mean that the input-output command is tenth in line to be read into the persistent storage device 110). In another embodiment, the host 105 may wait until there are no entries left in the submission queue for which an address translation has already been sent to the persistent storage device 110, and it may then send a fixed number N (e.g., ten) entries to the address translation cache 145. In another embodiment, the host 105 may request that the translation agent 125 send a number of address translation requests as a function of the device's speed (submission queue (SQ) entries or completion queue entries per second). In another embodiment, the host 105 may have a number N for reads and a different number M for writes. The virtual machine monitor 305 may send the translation request depending on the SQ HDB progress and the command type of the submission queue entry (SQE). Write operations may use address translation immediately, to transfer the data into the device immediately, whereas a read operation may not transfer data into the host until after some time delay and may not use address translation immediately. As such, in some embodiments, the virtual machine monitor 305 may choose to not send translation requests for reads, or it may choose to send translation requests for reads after a time delay.

Figure 4:
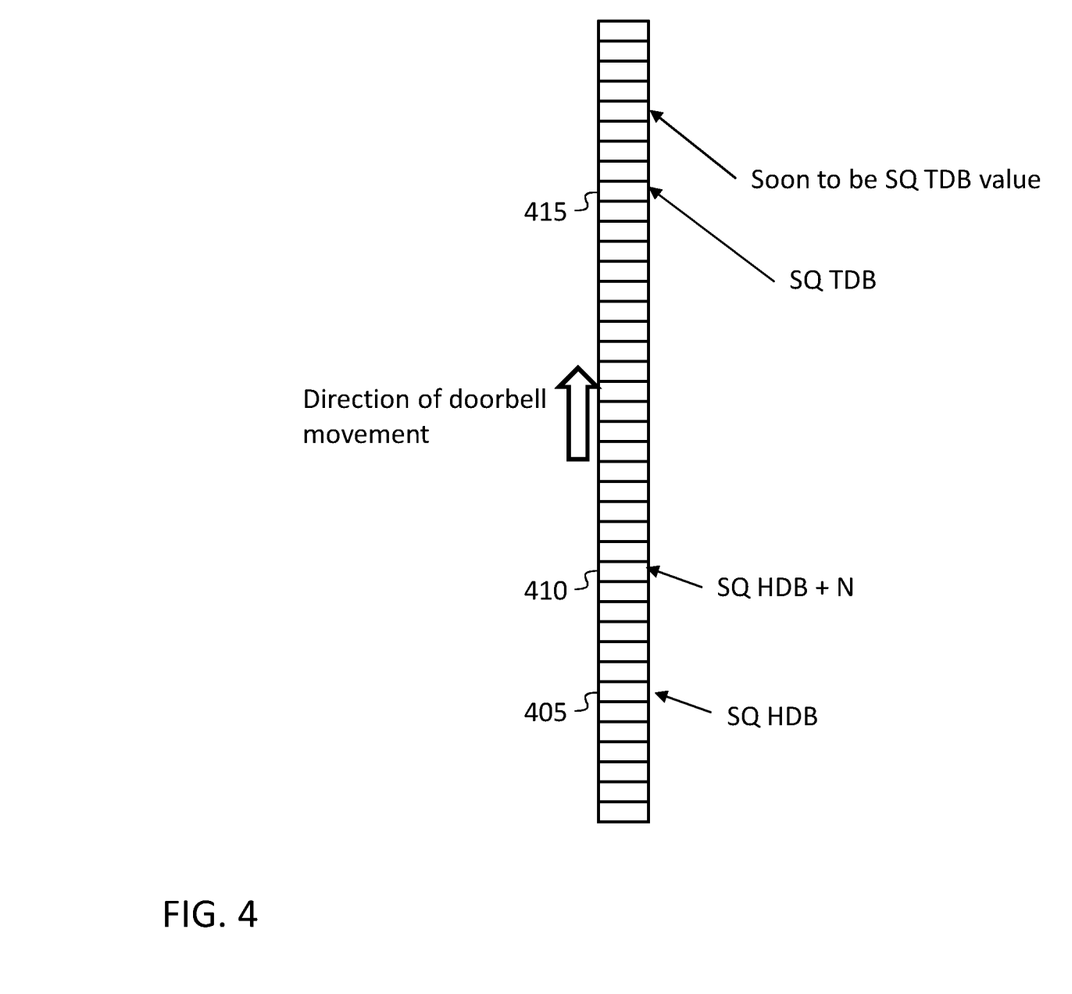
FIG. 4 is a schematic drawing of a submission queue, according to an embodiment of the present disclosure.

In operation, the host 105 may fill out one or more submission queue entries, and update the submission queue tail doorbell (TDB) 415 to inform the persistent storage device 110 of the new commands in the submission queue. The persistent storage device 110 may, at the same time, be independently reading one or more submission queue entries from the other side of the submission queue. The persistent storage device 110 may update the submission queue head doorbell as it does so, to inform the host 105 that those submission queue entries have been parsed by the persistent storage device 110 and that they are being processed within the persistent storage device 110.

The host 105 then uses the submission queue head doorbell value and the submission queue entry format to identify, within the submission queue entries, memory addresses that will need address translation by the persistent storage device 110 (e.g., the three fields, of the fields shown in FIG. 2, that may contain virtual addresses which may be translated before data transfers using direct memory access are performed). The host 105 then sends an address translation command to the translation agent 125 to instruct the translation agent 125 to send the address translations to the device, using the address translation caching command. The persistent storage device 110 receives the address translation caching command and, in accordance with policies it has in place for managing the address translation cache 145, stores the address translations in the address translation cache 145 (or, if the policies dictate otherwise, discards the address translations).

In some embodiments, instead of the host 105 sending address translations to the persistent storage device 110, the host 105 may make the address translations available for the persistent storage device 110 to fetch. For example, the host 105 may request an address translation from the translation agent 125 for some or all relevant addresses for an input-output command (e.g., for the three fields, of the fields shown in FIG. 2, that may contain virtual addresses which may be translated before data transfers using direct memory access are performed), and put the address translations in one location (e.g., in the memory 120) for the persistent storage device 110 to fetch (e.g., using direct memory access) and to insert into the address translation cache 145. For example, the location may be an additional metadata area in the memory 120, or unused space in a submission queue entry (to accomplish this the size of submission queue entries may be increased), or in a permanently agreed-upon location in Compute Express Link cache (CXL.cache) address space, such that the persistent storage device 110 is able to recognize the update from the host 105, and it is able to copy it into the address translation cache 145.

Other memory locations (e.g., in the memory 120, in PCIe Base Address Register (BAR) space, in Controller Memory Buffers (CMBs), or in CXL.mem) may be used in an analogous manner; in such a case the persistent storage device 110 may not receive snoop alerts and may therefore periodically trigger re-reads of these locations.

In such an embodiment, the virtual machine monitor 305 may be requesting the address translations from the translation agent 125 when the submission queue entry has already been sent to the persistent storage device 110. This may mean that a translation agent 125 initiating an address translation invalidation may only know of the virtual machine monitor 305 requesting the translation. Therefore, invalidations may be sent to the virtual machine monitor 305, but the persistent storage device 110 may be reading this shared memory location at any time. This may result in a race condition of the address translation invalidation and the device reading the address translation. The CPU 115 may therefore be responsible for implementing a coherent read and update scheme on such a memory space. In one embodiment, a CPU 115 may implement a vendor specific coherency scheme. In another embodiment, the coherency of CXL.cache may be leveraged. The persistent storage device 110 may set up a snoop to be alerted when there are writes on the shared memory location. In another embodiment, the host 105 may implement a locking scheme over the shared memory location for the address translations. The layout of address translation values in such a memory location may include (i) DWORD 0: Number of valid translations, (ii) DWORD 1&2: virtual address, and (iii) DWORD 3&4: physical address. The CPU may then lock the shared memory location, update the header and modify the address translation list, and unlock the shared memory location. In another embodiment, the translation agent 125 may broadcast address translation invalidations to all connected memory address users independent of their location, for example by appending an "invalidate entry" or lock and modifying address translation values.

In some embodiments, instead of the host 105 sending address translations to the persistent storage device 110 using an address translation caching command, the host 105 may populate a pre-translated address in the submission queue entry. The host 105 may then also communicate to the persistent storage device 110 that it has already provided the translated address. This communication may take the form, for example, of (i) one or more bits in the submission queue entry stating that the addresses (e.g., in the three fields, of the fields shown in FIG. 2, that may contain virtual addresses which may be translated before data transfers using direct memory access are performed) are already translated; or (ii) a setting on the persistent storage device 110, NVMe Subsystem, NVMe controller, NVMe Namespace, etc., that informs the persistent storage device 110 that it will always be provided translated addresses.

In another embodiment, the NVMe expectations for metadata, PRP, and/or SGL data locations may be modified. For example, the PRP or SGL linked lists may be modified to first point to a buffer of relevant address translations of all of the PRPs and SGLs followed by the normal PRPs and SGLs required for the command. In this embodiment, the virtual machine might leave the first segment blank followed by filling out the normal PRP and SGL information. The virtual machine monitor 305 may then fill out the first PRP or SGL with valid address translations and mark them as valid translations. Such an embodiment may avoid the need for the persistent storage device 110 to request a translation or to fill space in the address translation cache because each address in the submission queue entry may already be correct.

Although examples are given herein in the context of a host 105 interacting with a persistent storage device 110, it will be understood that the systems and methods disclosed herein are equally applicable to peers on PCIe and Fabrics and different memory locations. Moreover, in some embodiments, an address translation request may be made on behalf of the persistent storage device 110 by another component. For example, a second host processor (e.g., in the case of a dual ported host) may send an address translation request to the translation agent 125 within the first host 105, or a graphics processing unit (GPU) may send an address translation request to the translation agent 125 within the first host processor.

The persistent storage device 110 may have a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface, through which it may be connected to the host 105, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS).

Figure 5A:
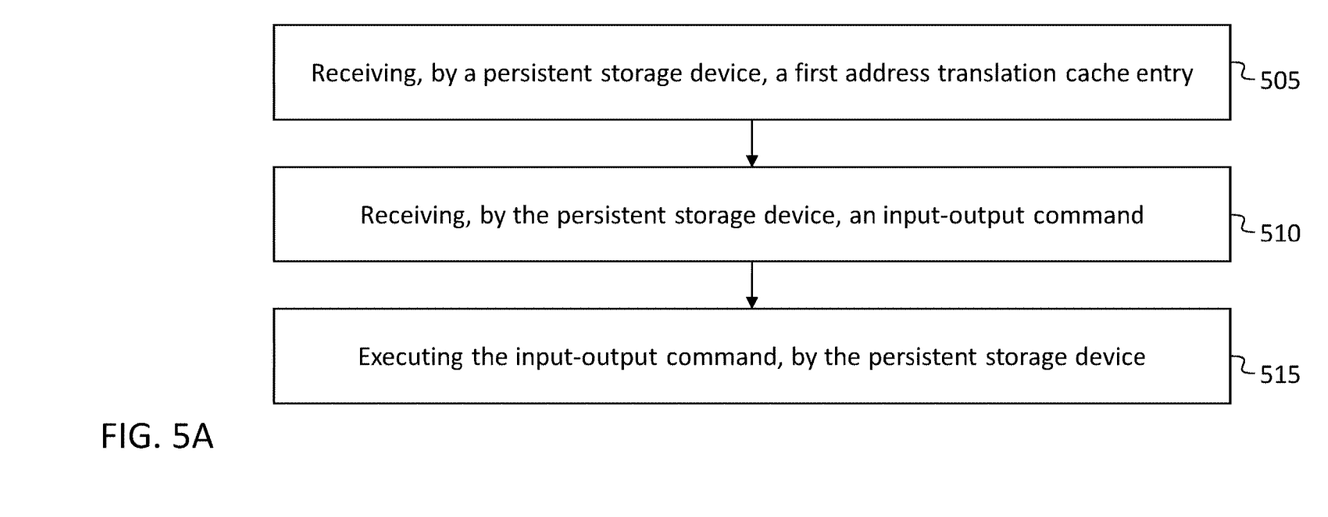
FIG. 5A is a flowchart of a storage-device-side method, according to an embodiment of the present disclosure.
Figure 5B:
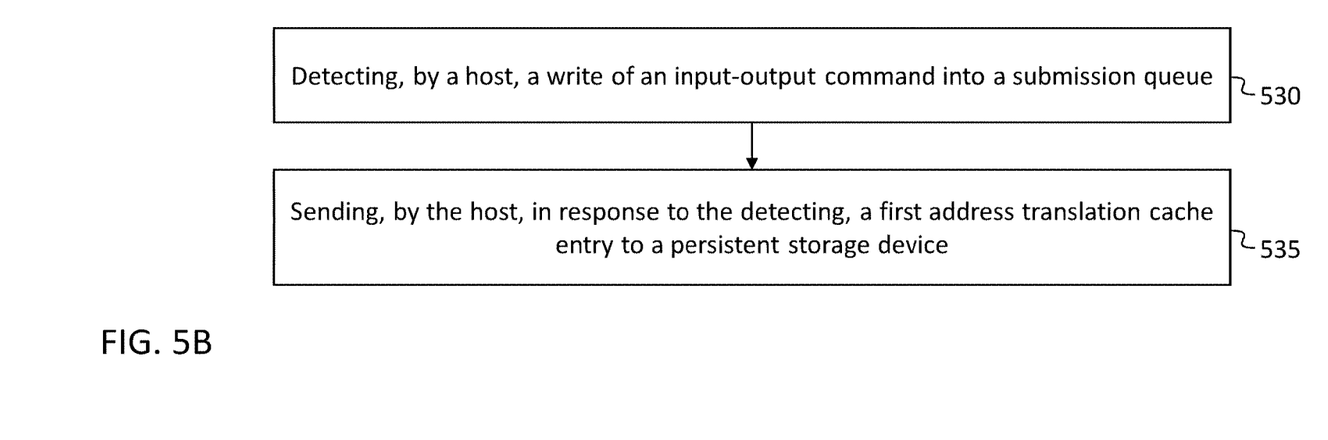
FIG. 5B is a flowchart of a host-side method, according to an embodiment of the present disclosure.

FIG. 5A is a flowchart of a first method. In some embodiments, the method includes receiving, at 505 by a persistent storage device, a first address translation cache entry; receiving, at 510, by the persistent storage device, an input-output command; and executing, at 515, the input-output command, by the persistent storage device, the executing of the input-output command including performing direct memory access of a memory location at an address calculated based on the input-output command and based on the first address translation cache entry. FIG. 5B is a flowchart of a second method. In some embodiments, the method includes detecting, at 530, by a host, a write of an input-output command into a submission queue; and sending, at 535, by the host, in response to the detecting, a first address translation cache entry to a persistent storage device.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1-35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for host provided address translation cache prepopulation have been specifically described and illustrated herein, many modifications and variations will be apparent to those skilled in the art. Accordingly, it is to be understood that a system and method for host provided address translation cache prepopulation constructed according to principles of this disclosure may be embodied other than as specifically described herein. The invention is also defined in the following claims, and equivalents thereof.

What is claimed is:

1. A method, comprising:
receiving, by a storage device, a first address translation cache entry comprising information for accessing, by the storage device, a memory location that is external to the storage device, the first address translation cache entry being associated with an input-output command that is external to the storage device;
populating an address translation cache of the storage device with the first address translation cache entry that is associated with the input-output command that is external to the storage device;
receiving, by the storage device, the input-output command; and
executing the input-output command, by the storage device,
the executing of the input-output command comprising performing, by the storage device, direct memory access of the memory location,
the memory location being at an address calculated based on the input-output command and based on the first address translation cache entry.

2. The method of claim 1, wherein the input-output command is a write command.

3. The method of claim 1, wherein the receiving of the first address translation cache entry comprises receiving a Peripheral Component Interconnect Express (PCIe) command comprising the first address translation cache entry.

4. The method of claim 3, wherein the PCIe command further comprises an identifier identifying a host process, a virtual address used by the host process, and an address translation.

5. The method of claim 1, further comprising storing the first address translation cache entry in a segment of an address translation cache of the storage device, the segment being reserved for prepopulated address translation cache entries.

6. The method of claim 1, further comprising:
determining a first weight for the first address translation cache entry;
determining a second weight for a second address translation cache entry stored in an address translation cache of the storage device;
determining that the first weight exceeds the second weight;
evicting the second address translation cache entry from the address translation cache; and
storing the first address translation cache entry in the address translation cache.

7. The method of claim 1, wherein the receiving of the first address translation cache entry comprises implementing, by the storage device, a snoop of an address location.

8. The method of claim 1, wherein the memory location is the memory location of a Scatter Gather List (SGL) pointer or of a Physical Region Page (PRP) pointer.

9. A storage device, comprising:
a processing circuit; and
a memory, operatively connected to the processing circuit and storing instructions that, when executed by the processing circuit, cause the storage device to perform a method, the method comprising:
receiving a first address translation cache entry comprising information for accessing a memory location that is external to the storage device, the first address translation cache entry being associated with an input-output command that is external to the storage device;
populating an address translation cache of the storage device with the first address translation cache entry that is associated with the input-output command that is external to the storage device;
receiving the input-output command; and
executing the input-output command,
the executing of the input-output command comprising performing, by the storage device, direct memory access of the memory location,
the memory location being external to the storage device and at an address calculated based on the input-output command and based on the first address translation cache entry.

10. The storage device of claim 9, wherein the input-output command is a write command.

11. The storage device of claim 9, wherein the receiving of the first address translation cache entry comprises receiving a Peripheral Component Interconnect Express (PCIe) command comprising the first address translation cache entry.

12. The storage device of claim 11, wherein the PCIe command further comprises an identifier identifying a host process, a virtual address used by the host process, and an address translation.

13. The storage device of claim 9, wherein the method further comprises storing the first address translation cache entry in a segment of an address translation cache of the storage device, the segment being reserved for prepopulated address translation cache entries.

14. The storage device of claim 9, wherein the method further comprises:
determining a first weight for the first address translation cache entry;
determining a second weight for a second address translation cache entry stored in an address translation cache of the storage device;
determining that the first weight exceeds the second weight;
evicting the second address translation cache entry from the address translation cache; and
storing the first address translation cache entry in the address translation cache.

15. The storage device of claim 9, wherein the receiving of the first address translation cache entry comprises implementing, by the storage device, a snoop of an address location.

* * * * *